INVENTOR:
LUDWIG VOGT

INVENTOR:
LUDWIG VOGT

INVENTOR:
LUDWIG VOGT

United States Patent Office 2,979,087
Patented Apr. 11, 1961

2,979,087

DEVICE FOR THE FLUID FLOW CONNECTING OF STATIONARY CONDUITS AND PORTABLE FLUID CONTAINERS SUCH AS TANK CARS

Ludwig Vogt, Duisburg-Hamborn, Germany, assignor to Ruhrchemie Aktiengesellschaft, Oberhausen-Holten, Germany, a German corporation Filed Aug. 15, 1957, Ser. No. 678,402

Claims priority, application Germany Aug. 22, 1956

12 Claims. (Cl. 141—113)

This invention relates to a device for the fluid flow connecting of stationary conduits and portable fluid containers such as tank cars.

Portable fluid containers such as liquid containers and in particular tank cars are generally filled and emptied at stationary filling and/or emptying stations. For this purpose the container such as the tank car is generally brought alongside the station and filled or emptied by means of removable conduits. These removable conduits must be fluid tight at the highest pressures which same will encounter in the filling or loading operation. The removable conduits are generally in the form of flexible hoses of metal, rubber or plastics since rigid pipes are extremely difficult to adapt to the constantly varying distances between the removable containers and the stationary pipes of the filling or emptying station. The flexible hoses, however, have the disadvantage that the same are very unwieldly to handle at higher operating pressures. Additionally unskillful manipulation and natural wear may easily cause leakages which in the case of low boiling and combustible liquids may entail hazards.

Figure 1:
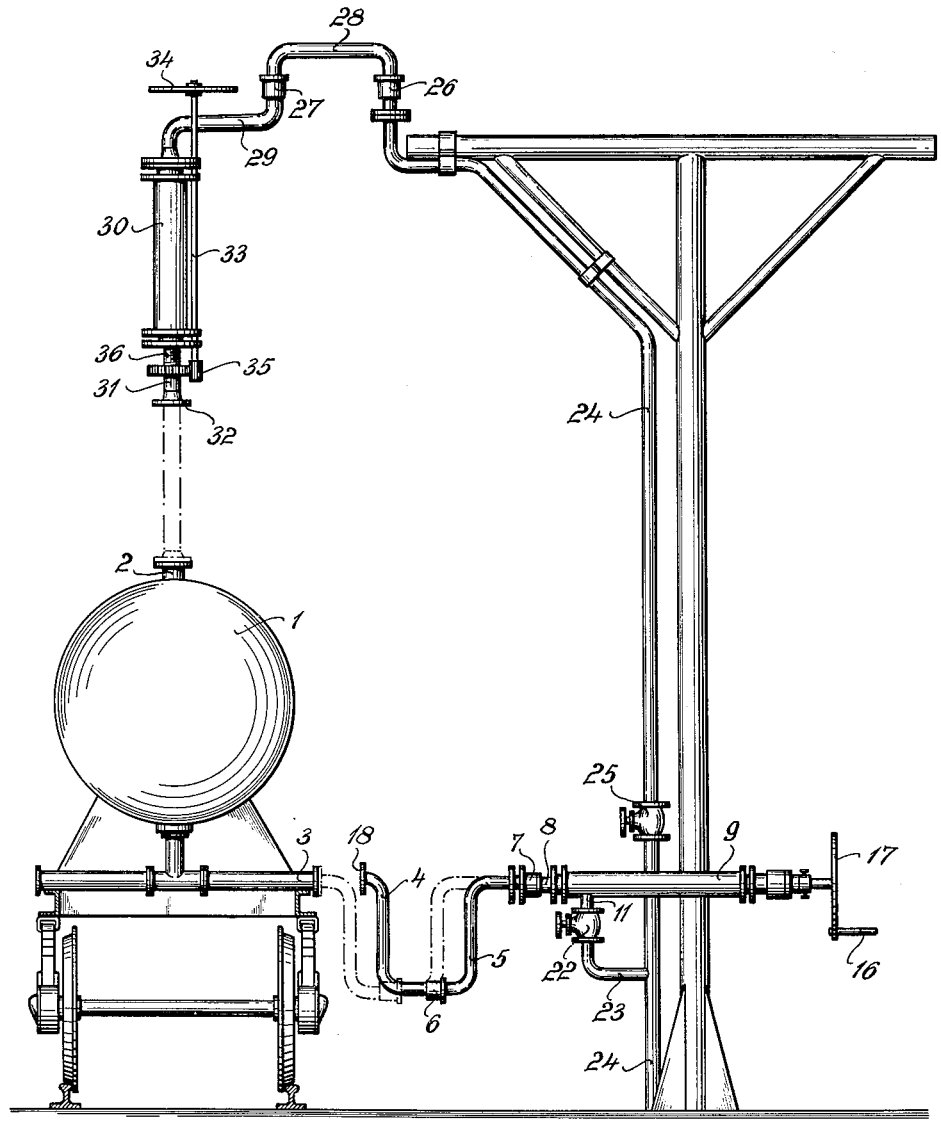
Figure 2:
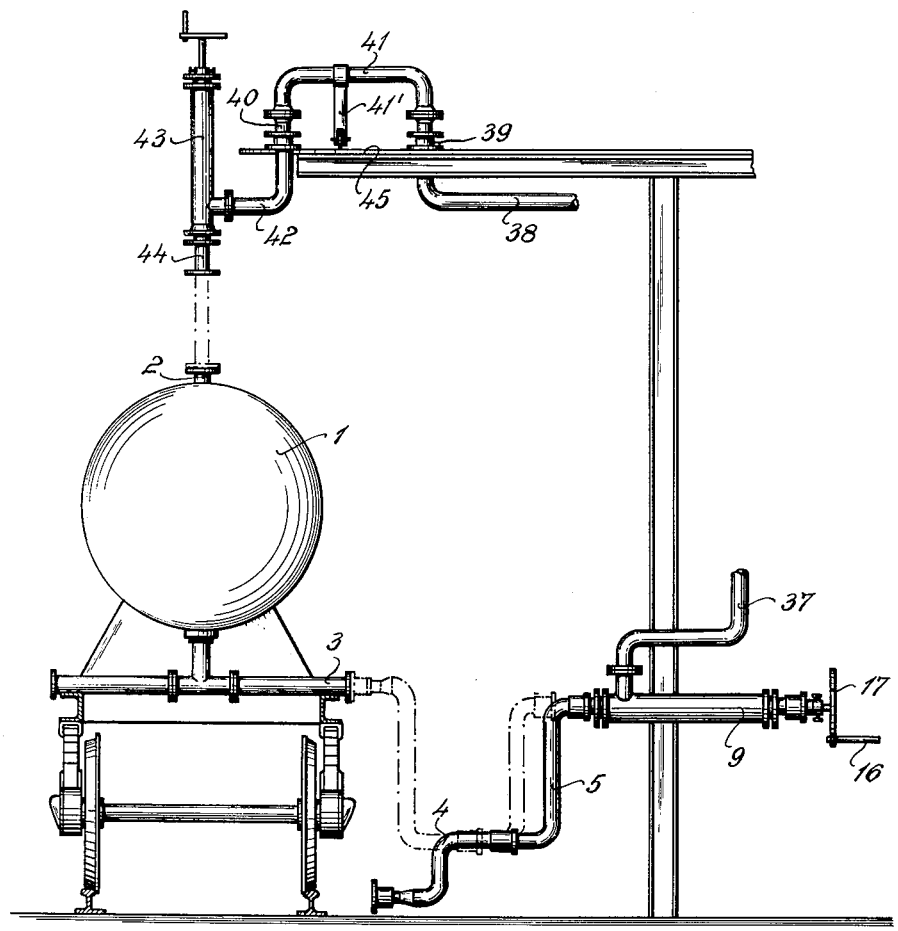
Figure 3:
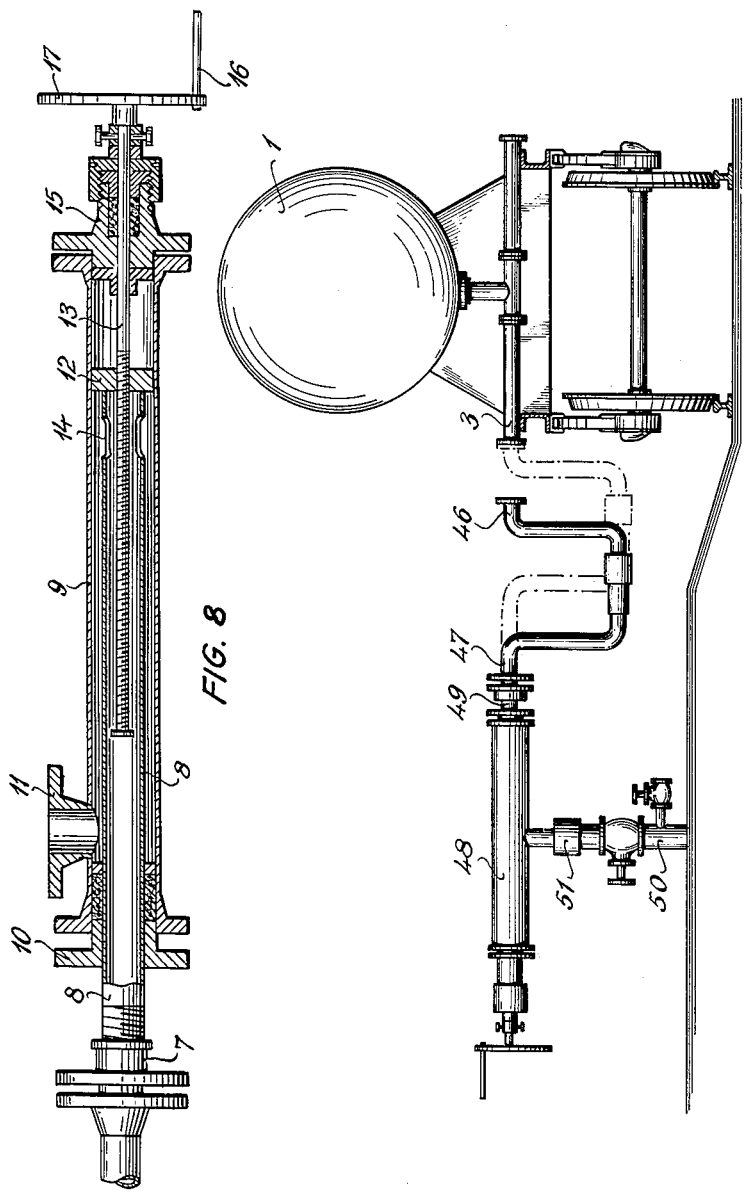
Figure 4:
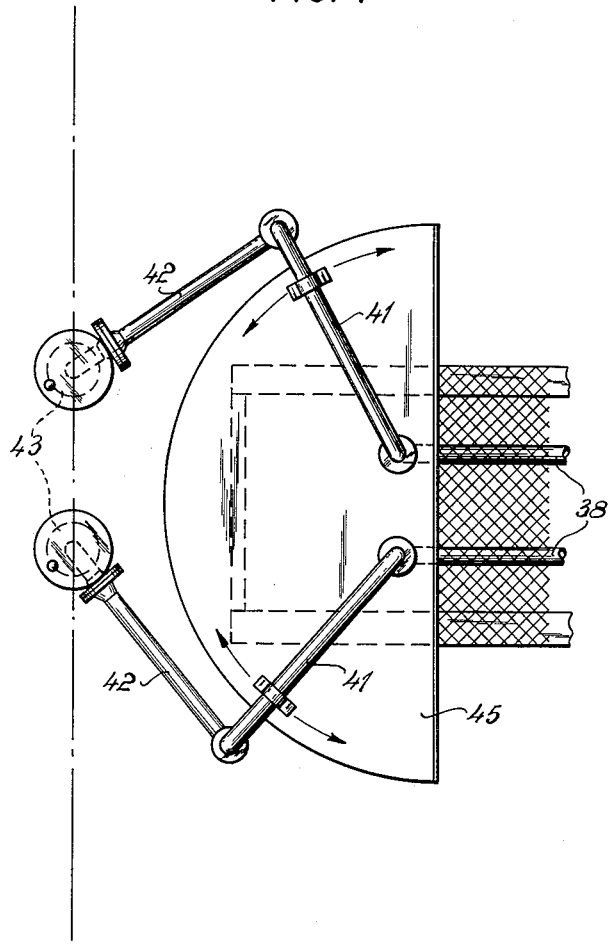
Figure 5:
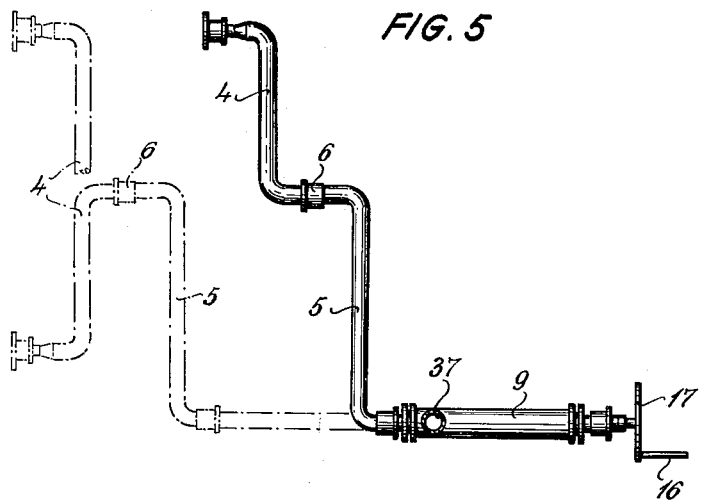
Figure 6:
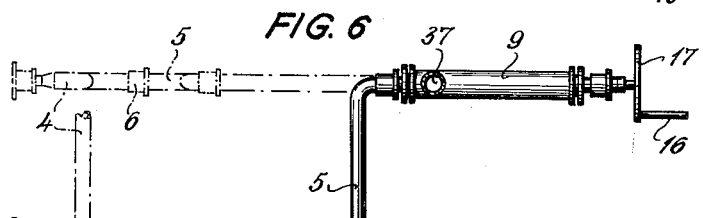
Figure 7:
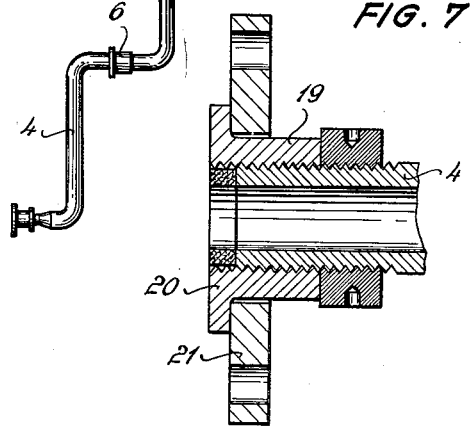

One object of this invention is a device for fluid flow connecting stationary conduits and portable fluid containers which is easily adapted to the constantly varying distances between the movable containers and the stationary conduit, and which overcomes the above mentioned disadvantages in connection with flexible hoses. This and still further objects will become apparent from the following description read in conjunction with the drawings in which:

Fig. 1 diagrammatically shows a side elevation of an embodiment of a filling and emptying device for portable containers such as tank cars in accordance with the invention, Fig. 2 is a diagrammatic side elevation of a further embodiment of a device in accordance with the invention, Fig. 3 is a diagrammatic side elevation of a still further embodiment of a device in accordance with the invention, Fig. 4 is a diagrammatic plan view of the device shown in Fig. 2, Figs. 5 and 6 are diagrammatic side elevations showing in detail the various operating positions of the pipe connection in accordance with the invention, Fig. 7 is a vertical section showing an embodiment of a flange connection in accordance with the invention and, Fig. 8 is a diagrammatic vertical section showing in detail the extensible sleeve and pipe section of the embodiment at Fig. 1.

The device in accordance with the invention comprises a first substantially rigid Z bent pipe having means at one end thereof for fluid flow connection with a portable container such as a railway tank car. These means preferably are in the form of a flange which may be connected to the inlet or discharge openings of the tank car and which is removable for exchange with a flange of different size to allow use in connection with different types of containers. A second bent substantially rigid pipe as for example a Z or U bent pipe is connected to the other end of the first pipe by means of fluid tight connection means such as a stuffing box which allows rotational connection between the two pipes for at least limited rotation about the axis of the connected portions which is preferably parallel to the axis of the rotatable connection flange mentioned above. Connection means such as a stuffing box interconnect the other end of the second pipe to a stationary conduit for at least limited rotation about an axis substantially parallel to the axis of rotation of the first connection. A sleeve having a pipe section positioned therein for axial movement in and out with a fluid tight fit is connected in flow communication with the pipes between the flange and the stationary conduit substantially parallel to the axes of rotation of the connections. Means, for example a screw spindle, is provided for moving the pipe in and out of the sleeve.

This arrangement allows a very easy positioning of the flange within a fairly wide area the size of which is dictated by the length of the bent pipes and the length of axial movement of the pipe section in the sleeve so that the pipe section may very easily be connected to the inlet or discharge of a portable container such as a tank car despite the variation in distances and positioning in the loading or the unloading of various individual cars.

Referring to the embodiment shown in Fig. 1 of the drawing the tank car 1 to be filled or emptied is movable on rails in the conventional manner and provided with the conventional filling connection 2 and emptying connection 3. A stationary conduit 24 leading, for example, to a storage tank is provided for the emptying and/or filling of the car. For the emptying a Z bent first rigid pipe 4 is provided having the flange connection 18 at its end for connection to the discharge connection 3 of the tank car. This flange may be constructed in the manner shown in Fig. 7 and have a screw socket 19 positioned on the end of the pipe 4. The screw socket 19 has the annular flange 20 at its forward end which engages a flange 21 provided with holes which is connected to the connection 3 in the conventional manner. The flange 21 may be removed from the pipe 4 by means of the screw socket 19 and replaced with a flange of a different size or dimension so that same may be adapted to fit various types of connections which may be encountered on the various tank cars to be emptied.

The first Z bent rigid pipe 4 is connected to a second Z bent rigid pipe 5 by means of the stuffing box 6 which allows rotation of the pipes with respect to each other about the axes of the connected portions which are parallel to the axis of flange 18. The stuffing box 6 provides a fluid tight and, if necessary, pressure tight connection. The second Z bent pipe 5 is connected by means of the stuffing box 7 to a pipe section 8 and is, by means of the stuffing box, rotatable with respect to the pipe section 8, about an axis of rotation which is parallel to the axis of rotation at 6. Instead of the two length pipes 4 and 5 any additional number of lengths of pipes may be similarly connected though, in general, two lengths of pipes which are rotatable relative to each other are sufficient. The pipe section 8 is slidably positioned within the sleeve 9 with a fluid tight fit by means of a stuffing box 10 as may best be seen from Fig. 8. The free end of the pipe section 8 extending within the sleeve 9 is provided with a screw nut 12 through which a threaded screw spindle 13 extends. The screw spindle 13 extends in a fluid tight manner through a stuffing box 15 sealing the other end of the sleeve 9. The end of the spindle 13 which extends through the stuffing box is connected to a wheel 17 provided with a crank handle 16 so that upon rotation of the wheel 17 by the crank handle 16 the spindle 13 will rotate screwing the screw nut 12 along the same and thus varying the position of extension of the pipe 8 from the sleeve allowing the same to be moved in and out by suitable turning of the crank 16. Flow openings or holes 14 are provided in pipe section 8 so that liquid flowing into the pipe section can flow outwardly through these holes into the sleeve 9 and out from the sleeve 9 through the connection 11. The sleeve 9 and pipe section 8 are positioned with their axes parallel to the axes of rotation at the connections 6 and 7. The sleeve 9 is connected by means of the connection 11 valve 22, and pipe 23, to the stationary conduit 24, through which the liquid from the tank car is withdrawn or supplied. The end of the pipe 5 connected to the stuffing box 7 is thus in fluid flow communication with the stationary conduit.

In operation the tank car 1 is brought alongside the stationary conduit 24 and the flange 18 is placed in axial alignment with the discharge connection 3 of the tank car. This may be very easily accomplished since the flange 18 may assume any position in a relatively wide area due to the rotatable connections at 6 and 7. The various manners in which the pipes may be positioned and the flange moved is shown in the dotted lines in Figs. 5 and 6. It may be noted the flange may be positioned at any point within its plane of movement which is described by an arc having a radius equal to the combined lengths of the pipes 4 and 5. The flange 18 has previously been selected to mate with the discharge connection 3 and when in axial alignment by suitable rotation of pipes 4 and 5, crank 16 is cranked moving pipe section 8 outwardly until flange 18 contacts the connection 3 as shown in dotted lines in Fig. 1. The flange connection is then made secure in the usual manner with a fluid tight fit as for example by means of bolts, the valve 22 opened and the valve 25 closed and the tank car emptied through the conduit 24.

The portion of the device shown in Fig. 2 for emptying the tank car corresponds exactly to that shown in Fig. 1 except that a separate stationary conduit 37 is provided through which the fluid from the tank car flows and which is not connected to the conduit for filling the tank car.

In the embodiment shown in Fig. 3 a vertical stationary conduit 50 is provided. The sleeve 48 which corresponds to the sleeve 9 of Figs. 1 and 2 is horizontally mounted on the conduit 50 for rotation in the horizontal plane by means of the stuffing box 51. The pipe section 49 corresponds exactly to the pipe section 8 in Fig. 1, the pipe 47 to the pipe 5 and the pipe 46 to the pipe 4. In all other respects the construction and operation of the device is identical as that shown in Fig. 1 and the same may be used for both filling and emptying the tank car 1. When filling is effected the fluid must be pumped under pressure up through the conduit 50, sleeve 48, pipe section 49, pipes 47 and 46 into the filling or drain connection 3 of tank car 1. This embodiment is particularly adapted for filling or emptying normally liquified gases or gases which are easily liquified under pressure. Due to the horizontal pivoting of the filling or drain connection 3 the device may be reversed as for example for filling or emptying a tank car on its opposite side and thus may for example be positioned between two parallel pairs of railroad tracks.

In order to fill the tank car 1 from above the device Fig. 1 is provided with a first substantially rigid Z bent pipe 29 which is rotatably connected by means of the stuffing box 27 to the U bent rigid pipe 28 which is rotatably connected at the other end by means of the stuffing box 26 to the stationary conduit 24. A flange 32 which corresponds to the flange 18 is provided for connection to the inlet 2 of the tank car as for example in the conventional manner by bolts or the like. The axes of rotation of 26 and 27 are vertical and parallel to each other and to the vertical axes of the flange 32. Positioned between the flange 32 and the end of the pipe 29 opposite the stuffing box 27 is a sleeve 30 in which the pipe section 31 is axially slidable with a fluid tight fit by means of the stuffing box 36. The pipe section 31 which carries the flange 32 may be slid in and out of the sleeve 30 by means of the hand wheel 34 which actuates the gear drive 35 which in turn engages a suitable rack or screw device on the pipe section 31. Fluid such as liquid may flow through the conduit 24, pipe 28, pipe 29, sleeve 30 into the pipe section 31 and thus through the flange connection 32.

In operation tank car 1 is rolled in position and flange 32 is adjusted in vertical alignment over the connection 2 by suitable movement of the pipes 29 and 28. In this connection the exact position of the flange 32 may be widely varied to correspond to the positioned tank car 1 by articulation of the pipes 28 and 29 around the joints 26 and 27 in the same manner that flange 18 is adjusted.

When the flange 32 is in vertical alignment of the flange 2 the hand wheel 34 is cranked extending the pipe section 31 until the flange 32 contacts the inlet connection 2 of the tank car 1 as shown by the dotted line. Flange 32 is then made secure to the connection 2 in a fluid tight manner as for example by bolting the same on. The valve 22 is closed and the valve 25 opened and tank car is loaded through the conduit 24, pipe 28, pipe 29, sleeve 30, pipe section 31 and flange 32 with the fluid being gravity fed or pumped under pressure depending on the position of the tank to which the conduit 24 is connected.

All of the joints formed by the stuffing boxes as for example the stuffing boxes 36, 27 and 26 may in addition to being fluid tight may be pressure tight so that the same will withstand the highest pressure which the system will encounter.

In the filling device of Fig. 2 the sleeve 43 which corresponds to the sleeve 9 of Fig. 1 and the pipe section 44 which corresponds to the pipe section 8 of Fig. 1 form a portion i.e. one of the legs of the Z bend of the first rigid pipe 42. Pipe 42 is connected by means of the stuffing box 40 which allows rotational motion with respect to the U bent pipe 41 which in turn is rotatably connected by means of the stuffing box 39 to the stationary conduit 38 through which the filling fluid is supplied. The axes of the pipe section 44 which carries the connection flange and the axes of rotation at 40 and 39 are all vertical and parallel to each other. Pipe 41 is supported by means of a strut and roller 41' on the supporting platforms 45 as may additionally be seen from Fig. 4. The strut and roller 41' support pipe 41 and the roller rolls on the supporting platform 45 as pipe 41 is swung with its center of rotation at the stuffing box 39. In all other respects the construction and operation is identical to that shown in Fig. 1 with the extension and retraction of the pipe section 44 being effected in an identical manner as that of the pipe section 8 of Fig. 1.

While the invention has been described in detail with reference to the specific embodiments shown it is understood that the invention is not limited to these specific embodiments and various changes and modification which fall within the spirit of the invention and scope of the appended claims will become apparent to the skilled artisan.

What is claimed is:
1. Device for the fluid flow connecting of stationary conduits and portable fluid containers such as tank cars which comprises a first substantially rigid Z bent pipe having means at one end thereof for fluid flow connection with a portable fluid container, a second bent substantially rigid pipe, fluid tight connection means rotatably connecting the other end of said first pipe and one end of said second pipe for at least limited rotation about the axis of the connected portions, fluid tight con- nection means rotatably connecting the other end of said second pipe to a feed pipe, said feed pipe being connected with said stationary conduit for at least limited rotation about an axis substantially parallel to the axis of rotation of said first connection means, the free end of said feed pipe extending within a sleeve, said sleeve having a pipe section positioned therein for axial movement in and out with a fluid tight fit connected in flow communication with said pipes between said means for fluid flow connection with a portable container and said feed pipe substantially parallel to the axis of rotation of said bent pipes, a screw nut connected to the end of said pipe section positioned in said sleeve, a threaded spindle extending through the end of said sleeve opposite said pipe section in engagement with said screw nut, and means for manually rotating said threaded spindle for moving said pipe connection axially in and out of said sleeve.

2. Device according to claim 1 in which said means for fluid flow connection with a portable fluid container has its axis substantially parallel to the axes of rotation of said connection means.

3. Device according to claim 2 in which said means for fluid flow connection with a portable fluid container includes a flange removably connected thereto for exchange with a different dimensioned flange.

4. Device according to claim 1 in which said fluid tight rotatable flow connection means between said bent pipes and one end of said pipe with said feed pipe comprise stuffing boxes.

5. Device according to claim 1 in which said threaded spindle extends through a stuffing box closing the end of said sleeve opposite said pipe section.

6. Device according to claim 5 in which said means for manually rotating said threaded spindle include a hand wheel connected to said threaded spindle.

7. Device according to claim 1 in which said screw nut closes the end of said pipe section positioned in said sleeve and including lateral openings defined through said pipe section adjacent to said screw nut to establish flow communication from the interior of said pipe section to said sleeve.

8. Device according to claim 1 in which said second pipe is a substantially Z bent pipe and in which the axes of rotation of said connection means are substantially horizontal.

9. Device according to claim 1 in which said second pipe is a substantially U bent pipe and in which the axes of rotation of said connection means are substantially vertical.

10. Device according to claim 9 in which said second substantially U bent pipe is supported substantially at its central portion by means of a support strut having a roller at its end movable in rolling content with a support platform.

11. Device according to claim 1 in which said stationary conduit is a substantially vertical conduit and in which said sleeve is horizontally connected in flow communication with said stationary support conduit by means of a fluid tight connection allowing least limited rotational motion in a horizontal direction.

12. Device according to claim 11 in which said second pipe is a substantially Z bent pipe and in which the axes of rotation of said connection means are substantially horizontal.

References Cited in the file of this patent

UNITED STATES PATENTS

| 833,988 | Valerius | Oct. 23, 1906 |
| 1,654,300 | McGee et al. | Dec. 27, 1927 |

FOREIGN PATENTS

| 30,678 | Norway | Apr. 26, 1920 |
| 1,127,617 | France | Aug. 13, 1956 |